United States Patent [19]
Bias et al.

[11] Patent Number: 5,937,942
[45] Date of Patent: Aug. 17, 1999

[54] ELECTRONIC PROGRAMMABLE THERMOSTAT WITH TEMPORARY RESET

[75] Inventors: Larry Stephen Bias, Bartlett, Tenn.; Chung Ming Cheng, Tsien Wan, The Hong Kong Special Administrative Region of the People's Republic of China

[73] Assignee: Hunter Fan Company, Memphis, Tenn.

[21] Appl. No.: 09/042,907

[22] Filed: Mar. 17, 1998

[51] Int. Cl.$^6$ .............................. F24F 11/00; F25B 29/00
[52] U.S. Cl. ........................ 165/238; 165/265; 165/268
[58] Field of Search .................................. 165/238, 239, 165/265, 268; 236/46 R

[56] References Cited

U.S. PATENT DOCUMENTS

| | | | |
|---|---|---|---|
| 4,293,028 | 10/1981 | Levine | 165/239 |
| 4,751,961 | 6/1988 | Levine et al. | 165/238 |
| 4,771,392 | 9/1988 | Hall | 165/238 X |
| 4,997,029 | 3/1991 | Otsuka et al. | 236/46 R X |
| 5,329,991 | 7/1994 | Mehta et al. | 165/238 |
| 5,415,346 | 5/1995 | Bishop | 236/46 R X |

*Primary Examiner*—James C. Yeung
*Assistant Examiner*—Lance Chandler
*Attorney, Agent, or Firm*—Garrison, Morris & Haight, PLLC

[57] ABSTRACT

An electronic programmable thermostat having a program set made up of a plurality of program start times and program temperature values for a daily time period which can be automatically vacated upon initiation by the thermostat user. The user may initiate a temporary reset of the program time/temperature values whereby a microprocessor sets a new temperature value corresponding to a comfort temperature value obtained from one of the program temperature values. Preferably, the system automatically sets a temperature value equal to the highest temperature value of the program set temperatures, when in a heating mode, or the lowest temperature value when in a cooling mode. The system maintains such reset values until the beginning of one of the program start times depending upon when the reset feature was selected by the user.

19 Claims, 3 Drawing Sheets

ELECTRONIC PROGRAMMABLE THERMOSTAT WITH TEMPORARY RESET

BACKGROUND

1. Field of the Invention

The invention relates to the field of electronic thermostats and more particularly to a programmable electronic thermostat.

2. Description of Related Art

There are several programmable thermostats now available in the market. To operate these thermostats, a user may select a plurality of times within a day and assign a desired temperature to each time. Alternatively, a plurality of times and temperatures may be pre-programmable by the manufacturer and stored in a long-term or permanent memory such as a Read Only Memory (ROM). This information is then transferred and stored in a working memory such as a Random Access Memory (RAM). The thermostat then controls a heating and/or cooling system according to the programmed times and temperatures, i.e., a program set, in a well known manner. As used herein, the term "program set" shall refer to a group of programs, each program including a starting time and corresponding temperature. For example, the times and temperatures associated with program numbers 1–4 in Table 1 constitute a program set. An example of one program set having four programs for a heating cycle or mode is shown in Table 1.

TABLE 1

| Prog. | Time | Temperature | Remarks |
|---|---|---|---|
| 1 | 6:00 A.M. | 68° C. | Wakeup |
| 2 | 8:00 A.M. | 60° C. | No one at home |
| 3 | 3:30 P.M. | 69° C. | Children return home |
| 4 | 11:00 P.M. | 63° C. | Sleep |

As shown in Table 1, four start times and temperatures within a day are entered to define the program set. These entries are designated by program numbers (1–4). A time and a temperature is associated with each of these program numbers. The remarks are provided as an explanatory device for this example. In this example, at 6:00 A.M., the temperature is set at 68° F. This corresponds to a time when the user would normally wake up. By 8:00 A.M., the user leaves the house, and the temperature may be lowered. Thus, at 8:00 A.M., the temperature setting is lowered to 60° F. At 3:30 P.M. the user's children return to home, and it is desirable to raise the temperature to 69° F. Finally, at 11:00 P.M., the user goes to sleep, and the temperature is again lowered, i.e., to 63° F. Table 1 represents a single example of a program set containing a plurality of program times and temperatures which may be used to vary the temperature throughout the day based on the user's (or the user's family's) schedule, which the thermostat is to control. It is to be understood that other program sets may be desirable for other users.

A program set may be provided or transferred to a working memory or Random Access Memory (RAM) of the programmable thermostat in many different ways. As discussed above, the program set may be programmed by the user in accordance with instructions provided to the user either in a separate instruction manual or by prompts displayed on the thermostat display. Alternatively, the thermostat may include a pre-programmed program set created by the thermostat manufacturer that resides in a permanent or long term memory, such as the ROM, which pre-programmed program set is either automatically transferred into the working memory upon system initialization, from which the user can then alter according to his or her needs, or the manufacturer may have a plurality of program sets stored in the long term memory which a user can select to be transferred into the working memory. Further, programmable thermostats are known where such plural program sets, any one of which may be transferred into the working memory, may be altered by the user to create a special program set. An example of a programmable thermostat is described in U.S. patent application Ser. No. 08/665,206 filed on Jun. 14, 1996, entitled AUTO-PROGRAMMABLE ELECTRONIC THERMOSTAT, inventor V. Mehta, and assigned to the same assignee as the present application. See also, U.S. Pat. No. 5,329,991, assigned to the same assignee as another example of a programmable thermostat.

The programmable thermostats of the type described above are advantageous in that they permit the thermostat to control the heating and/or cooling operation within an environment that changes over the day in accordance with the user's particular schedule, thus saving energy costs. However, circumstances exist where the user's schedule is altered and requires the user to remain at home on a particular day, which then requires the user to either suffer through periods of undesirable temperature settings or having to re-program the thermostat in a manner that the user may be unaccustomed to and which may be relatively complicated. Thus, a need has arisen to provide a system that accommodates the user so as to quickly and easily, and temporarily, reset the program set temperature values then stored in working memory.

Programmable thermostats are also known to include override functions whereby a user may, using the controls on the thermostat panel, override the current setpoint temperature to set back or set up a new temperature, which may remain for a fixed time period or until the start of the next program time. The override temperature setting bears no relationship to, i.e., is not a function of, the programmed temperature values.

SUMMARY OF THE INVENTION

The present invention relates to a programmable thermostat under operating control of a microprocessor or similar computer processing unit and having at least a working memory that can be provided with at least one program set having a plurality of program times and corresponding program temperature values, over a daily time period, preferably for each of a heating and cooling cycle, whereby the user may in initiate vacating of the normal program cycle quickly, simply, and without recalling or learning complicated re-programming techniques. An input element or key on the housing of the thermostat may be specially dedicated to automatically initiate a vacating from the program time/ temperature values so as to automatically set the temperature to a comfort temperature for the user when the user plans to stay home, the comfort temperature being one of the program set temperature values, preferably the highest of the program set temperature values, when the thermostat is in a heating mode, or the lowest of the program set temperature values, when the thermostat is in a cooling mode. The input element may be conveniently identified, such as a "HOME TODAY" input element or key, so that the user can, with a single depression of such HOME TODAY key, automatically cause the processor to reset the current temperature set point value to the highest or lowest program set temperature value depending on the heating/cooling mode. If HOME TODAY was initiated prior to the penultimate program of the current program set being reached (prior to program no. 3 in the example of Table 1), the processor will maintain such reset temperature value until the last program time of the day is reached (program no. 4), at which time the system then reverts to the program temperature value for the last program of the day, i.e., reverts back to the normal program cycle to control further heating and/or cooling. In the event the HOME TODAY key is activated when already past the penultimate program start time of the day, the reset temperature value is maintained until the first program start time of the next day.

Thus, it is an object of the present invention to provide a simple, effective system and method for temporary resetting of a programmable thermostat having a plurality of times and temperature values to automatically utilize one of the pre-programmed temperature values as the set point temperature. It is an object of the present invention to provide a thermostat with a simple input element or key, such as an easily identifiable input key, that initiates the automatic resetting of the current program temperature value to the highest program set temperature value of the various program temperatures, when the system is in a heating mode, or the lowest program set temperature value when the system is in a cooling mode. It is further an object of the present invention to maintain this re-set temperature value until reaching one of the program start time values, whereby the system then automatically reverts back to the program temperature control without further user intervention.

These and other objects of the invention will be made apparent when reference is made to the drawings, descriptions and claims hereinbelow.

DETAILED DESCRIPTION OF PREFERRED EMBODIMENTS

Figure 1:
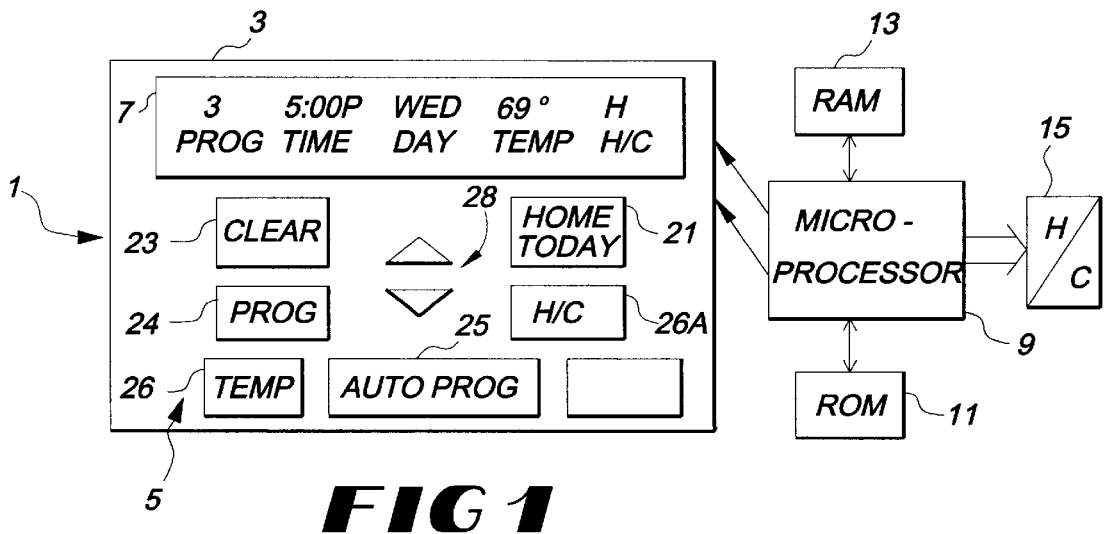
FIG. 1 is a schematic rendering of a thermostat control panel displaying current program set information and including certain schematically-depicted internal components.
Figure 2:
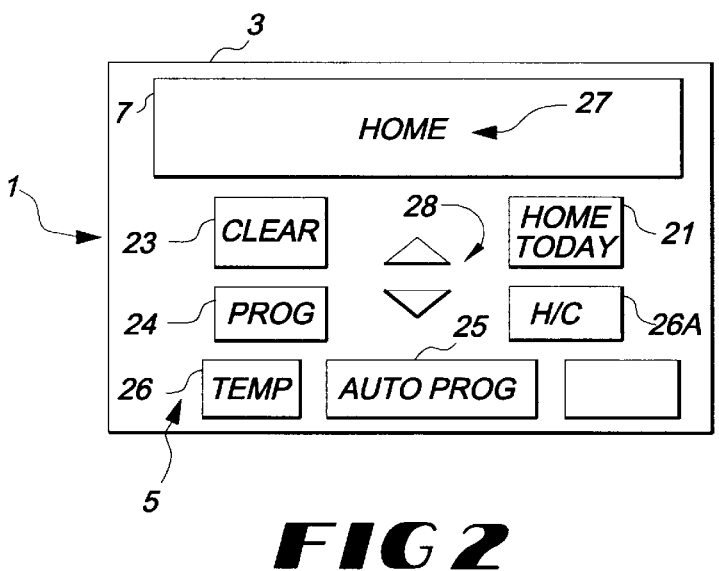
FIG. 2 is a schematic rendering of a thermostat control panel displaying the "HOME" indicia when the thermostat is in the so-called HOME TODAY mode.

The programmable thermostat 1 includes a thermostat housing having a control panel 3 with a plurality of input elements or input keys 5 and a display panel 7 for displaying various functions of the programmable thermostat, as depicted schematically in FIGS. 1 and 2. The design of the thermostat control panel of the present invention may be of various sizes, shapes and configurations. The programmable thermostat 1 may include many different computer architectures but generally requires a microprocessor or central processing unit (CPU) 9 having a permanent memory such as a read only memory (ROM) 11 for storing the program instructions for operation and control of the thermostat, and a working memory or random access memory (RAM) 13 that retains or receives at least the particular program set for that day. The program set, as is known in the art, includes a plurality of times and a plurality of temperatures over a given day such as the times and temperature values shown in Table 1, above. The microprocessor keeps track of the current day and the present time of day and determines which program of the various program sets the thermostat should be set in, when in its program mode, and then sets the temperature value and controls heating and/or cooling units 15 through relays, for example, as is well known in the art.

Programmable thermostats that include the present invention may be pre-programmed to enable the operator or user of the thermostat to create or program the thermostat to provide the program set in the working memory, in accordance with an instruction manual that the user receives with the thermostat or in accordance with prompts that are displayed on the display 7. Alternatively, a program set may be stored in the permanent memory by the thermostat manufacturer and this program set may be automatically transferred into the working memory upon initialization of the thermostat. Still further, a plurality of program sets may be pre-programmed by the manufacturer to be selected by the user and transferred into working memory. The user may also be able to alter one or more of the pre-programmed programs after storage in working memory. The present invention, directed to the HOME TODAY feature as will be described below, may be utilized with any such programmable thermostat. An example of a programmable thermostat to which the HOME TODAY feature may be utilized is described in copending patent application Ser. No. 08/665,206 filed on Jun. 14, 1996, entitled AUTO-PROGRAMMABLE ELECTRONIC THERMOSTAT, inventor V. Mehta, and assigned to the same assignee as the present application, the disclosure of which is incorporated herein by reference. FIG. 1 of such application depicts the housing of the programmable thermostat having display and control keys and the overall system architecture is shown in FIG. 2. The overall operation of a programmable thermostat is described therein and includes functions such as keeping track of the current time, day of week, various initialization functions, etc. all of which are part of the normal operation of a programmable thermostat and need not be repeated herein. See also U.S. Pat. No. 5,329,991 to Mehta et al., assigned to the same assignee, for another example of a programmable thermostat, the disclosure of which is also incorporated by reference. Of course, the programmable thermostats described in the above application and patent are only two examples of several programmable thermostats to which the inventive HOME TODAY feature, as it is identified herein, may be applicable. That is, the present invention is not limited to any specific programmable thermostat design.

FIG. 1 depicts, in schematic form, a thermostat 1 having a display 7 and a plurality of keys 5 including a HOME TODAY key 21. The HOME TODAY key 21 initializes the functions of the present invention as will be described. It should be apparent that the key 21 could be identified by some other indicia other than "HOME TODAY" and the particular identification is not a limitation of the present invention. It is desirable, however, to have a particular key that initiates the function of the present invention to include some indicia that a user would understand to perform the temporary resetting of the program time/temperature values when the user stays home. Several other function keys may be included including a "CLEAR" key 23 which will be described hereinbelow, a "PROGRAM" 24 and "AUTO PROGRAM" 25 key, the key 24 being used by an operator to initiate the setting of various program start times and temperature values while the key 25 is utilized by the operator to transfer into working memory one of one or more pre-programmed program sets. A temperature key 26 may be included to enable the user to manually set a particular temperature value, to override, for example, the program mode, and the "H/C" key 26A is used to change between a heating and a cooling mode as is well known in the thermostat art. The switching between heating and cooling may also be accomplished by a lever-type switch extending from the housing. Also typically included are up/down arrow keys 28 to raise and/or lower a temperature setting. Depicted on the display panel 7 of FIG. 1 is a display which occurs during the program mode whereby the particular program number is identified, the time of day and the day of the week is identified, the temperature setting is identified and whether the thermostat is in a heating or cooling mode. Other information or different information may be displayed. When the HOME TODAY key 21 is actuated, it is preferred that the display 7 communicates the entry into that mode by displaying some identifier such as the "HOME" identifier 27 as shown in FIG. 2.

Figure 3:
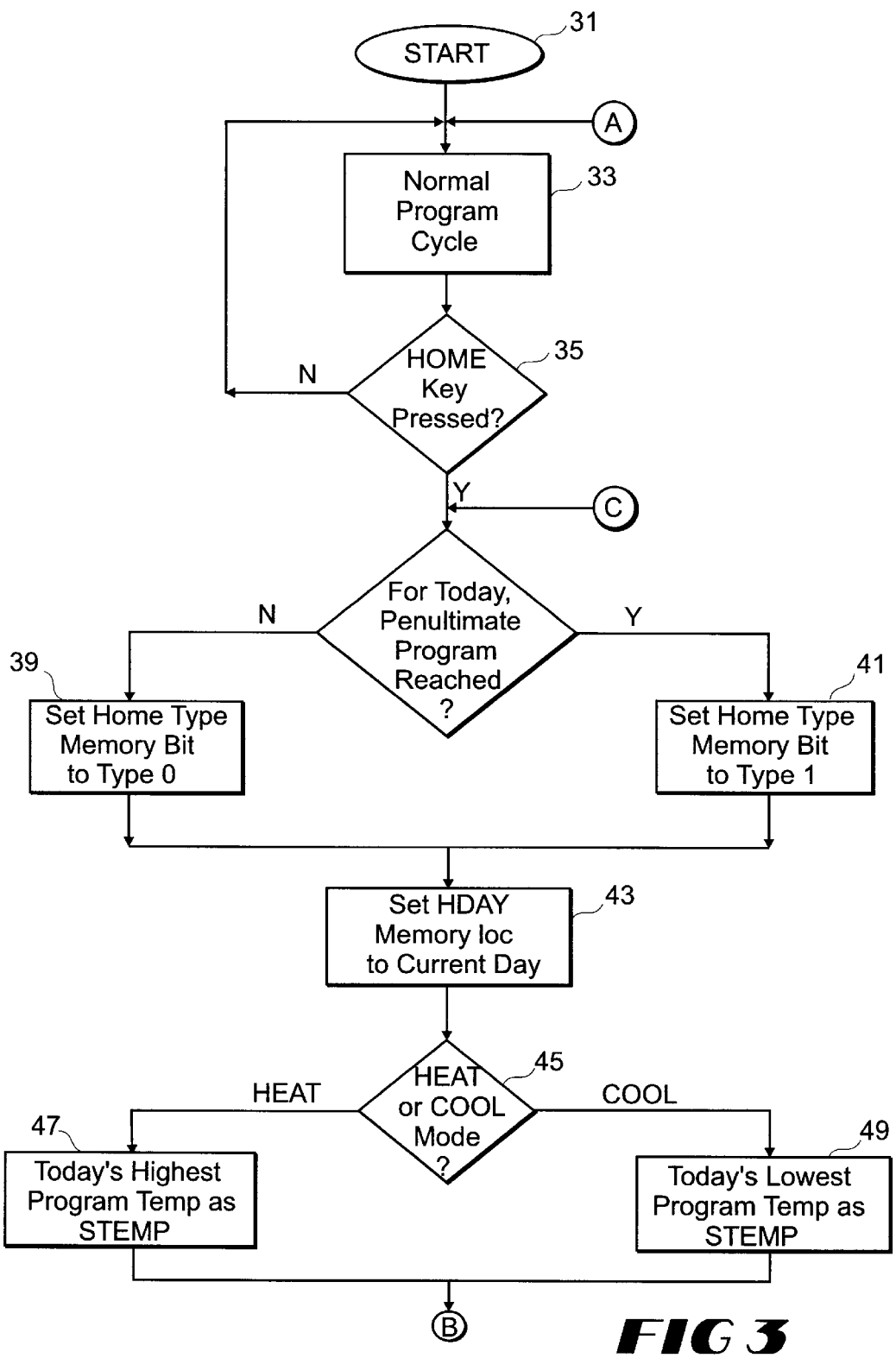
FIG. 3 is the first part of a flow chart of the HOME TODAY program mode.
Figure 4:
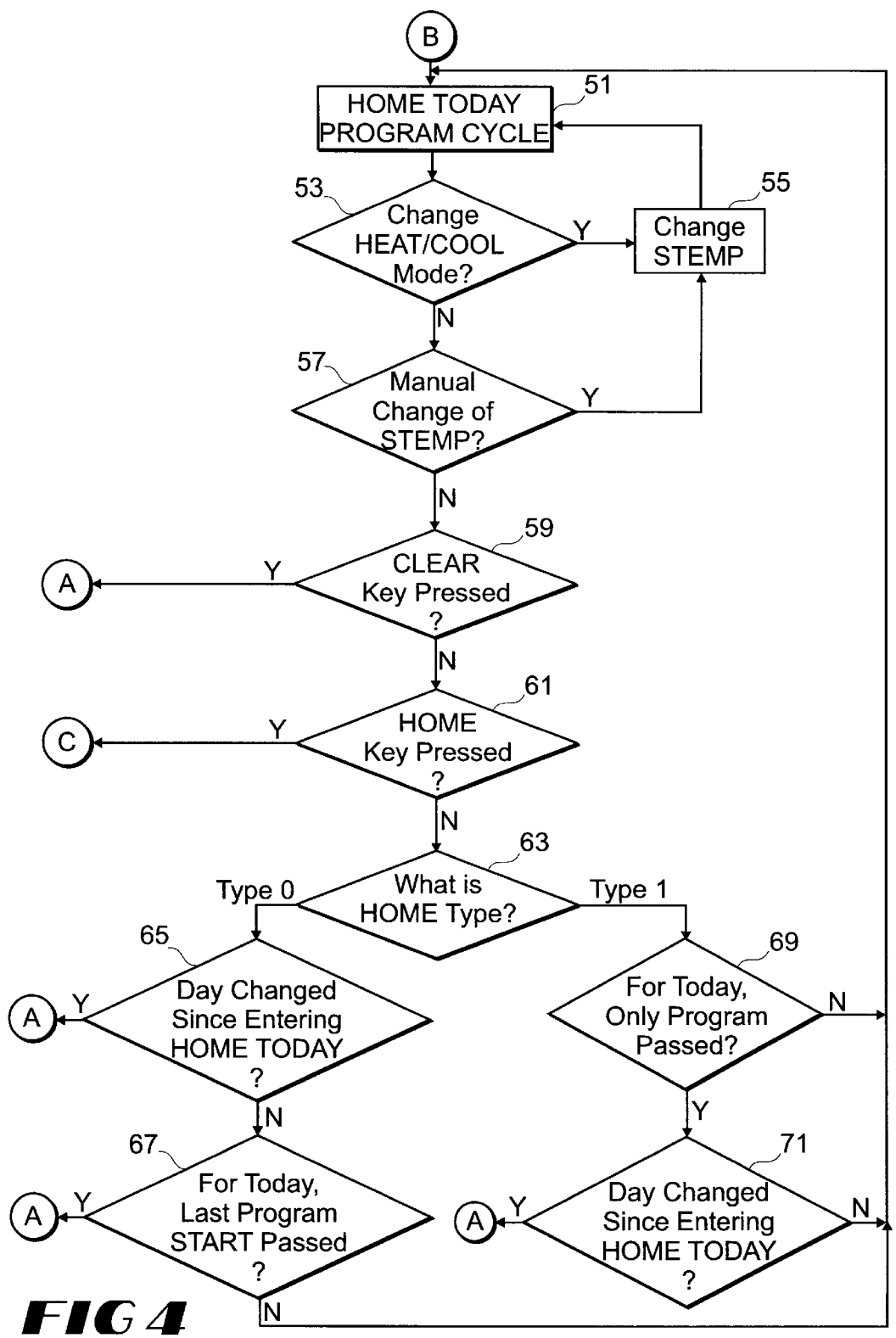
FIG. 4 is the second part of a flow chart of the HOME TODAY program mode.

The processor 9 controls thermostat operation in the HOME TODAY program cycle in accordance with program instructions set forth by the flow charts of FIGS. 3 and 4. The program instructions are pre-programmed by the manufacturer and stored in a long-term or permanent memory 11, along with the program instructions for performing the function of the program mode operation and other functions. The programming of programmable thermostats to perform various functions is well known in the programmable thermostat art and the flow charts of FIGS. 3 and 4 are sufficient to enable one of ordinary skill to program the thermostat to perform the HOME TODAY functions as will now be described.

Upon initialization or start up 31 of the thermostat, the thermostat will enter its normal program cycle 33, provided that the thermostat is placed in a program mode. As is known in the art, even programmable thermostats may have the capability of operating conventionally at a constant temperature setting. The present HOME TODAY invention is directed to a temperature set point resetting when the thermostat is operating in a normal program mode or cycle. In such normal program cycle (block 33), the microprocessor will keep track of the current time, compare it to the program times and set the temperature in accordance with the heating and cooling cycle as selected, as is known in the programmable thermostat art. The processor then determines if the HOME TODAY key is pressed, block 35. If so, it then checks to determine if a particular program, preferably the penultimate, or second from the last, program for that day has been reached, block 37. For example, with respect to the program set of Table 1, above, the penultimate program is program number 3. Of course, more or less than four programs for a daily program set may be provided, however four programs per day are typical and usually adequate to provide the desired changes in temperature values over the day.

If the penultimate program has not been reached, i.e., the start time for the penultimate program has not been reached, a memory bit or memory location, or flag, arbitrarily defined as the "Home Type" memory bit or location is set to a particular value, such as "Type 0", block 39. If the penultimate program had been reached, i.e., if the start time for the penultimate program had been reached, then the Home Type memory location or memory bit is set to "Type 1", block 41. These are arbitrary identifiers; what is important is that the system determines if the HOME TODAY key was pressed prior to reaching a particular one of the programs of the program set then in working memory, such as the penultimate program, or after reaching the penultimate program.

The program also keeps track of, in a memory location arbitrarily defined as "HDAY", the current day when the HOME TODAY key starts or is pressed, block 43. After storing or saving this day (such as Monday, Tuesday, Wednesday, etc.), the system then determines whether a heating or cooling mode is selected, block 45. If the heating mode had been selected, a set point temperature value (arbitrarily identified as STEMP) is set at a predetermined comfort temperature value for heating among the program temperatures, preferably the highest program temperature value of the program set temperature values that are then present in working memory for that day, block 47. For example, for the program set of Table 1, the STEMP for the heating mode is 69°. If in the cooling mode, the cooling comfort temperature value, preferably lowest program temperature value is set as the temperature set point (STEMP), block 49. The thermostat is then set to the STEMP temperature, i.e., the HOME TODAY program cycle 51 begins resulting in a display of "HOME" or similar indicia on the display, as shown in FIG. 2, and the setting and maintenance to the re-set temperature value, STEMP. During this temperature maintenance, the system continues to monitor various keys, and current day and time, as will be described.

The processor monitors the various input elements or keys 5, or is interrupted by an interrupt command when a particular key is depressed, and checks whether there is a change in the heating or cooling mode, block 53. That is, during the Home Today program cycle, an operator may decide to change the thermostat from the heat to the cool mode or vice versa. In addition, the thermostat has an "automatic" mode (not depicted) to enable the microprocessor to control automatic changeover between heat and cool modes. If a change is determined, either manual or automatic, the system changes the STEMP appropriately, at 55. That is, if the system was in the heating mode, the STEMP was set to the highest temperature value of the program set for that day that was within the working memory (block 47). The change to the cooling mode (block 53) would result in changing the STEMP to the lowest program temperature value. Similarly, had the HOME TODAY program been in the cooling mode (block 49), a change to the heating mode (at block 53) would result in a change of the STEMP from the lowest to the highest program temperature value for that day. If a change occurs, the system resets or changes the STEMP (at block 55) and then reverts back to maintain the HOME TODAY program cycle (block 51). It should be noted, however, that if the user had manually changed STEMP, in a manner described below, changeover between heat and cool modes does not reset STEMP.

The system determines if there is any manual change of the STEMP, block 57. That is, the HOME TODAY program cycle mode enables the user to manually change the override or STEMP temperature, after having been in the HOME TODAY program cycle. Such a temperature change can be initiated by the user pressing a specific input key, such as a TEMP key 26 and then raising or lowering the temperature by the arrow keys 28. The STEMP will now be changed to this manually reset value (at block 55). As will be described below, the manually reset STEMP will not be further changed during HOME TODAY.

If during the HOME TODAY program cycle, the CLEAR key is pressed (block 59), the system then reverts back to the normal program cycle. (At step 59, if affirmative, the program returns to block 33.) If the HOME TODAY key is pressed after the system is already in the HOME TODAY program cycle, as depicted in block 61, the system then returns to step 37 determining if the penultimate program has now been reached. The system then resets the Home Today memory bit to Type 0 or Type 1 (blocks 39, 41), as appropriate, sets the HDAY memory location (block 43), checks the heating or cooling mode (block 45) and sets the program temperature STEMP as appropriate (blocks 47, 49). If, however, STEMP was set by the manual override, step 57, it is assumed that the user prefers this setting and STEMP is not changed. Thus, if the HOME TODAY key was initially pressed prior to reaching the penultimate program and then, after being in the HOME TODAY mode (block 51) was depressed a second time prior to reaching the penultimate program, essentially no change in the HOME TODAY operation would be made. On the other hand, if the HOME TODAY key was pressed prior to reaching the penultimate program, and then pressed a second time after reaching the penultimate program, the HOME TODAY memory bit would now be changed from Type 0 to Type 1, in block 41, the significance of which will now be described.

When in HOME TODAY, the system routinely and periodically checks the Home Type, Type 0 or Type 1, at block 63. If Type 0 had been set, either initially or in subsequent selections of the HOME TODAY key, the system inquires if the day has changed since entering HOME TODAY, 65. That is, the HDAY memory location is checked and compared to the current day. A day change might occur in Type 0 if the operator manually changes or re-sets the current day of the week, such as resetting the clock for some reason, block 65. That is, assuming HOME TODAY is in operation, and the Home Type Memory Bit is Type 0, and the operator resets the thermostat to change the day, from Tuesday to Wednesday, for example, HOME TODAY is vacated (block 65 affirmative or "yes") and the system returns to its normal program cycle (block 33). Assuming this does not take place, the system then determines if the last program has passed i.e., if the last program start time has passed, i.e., has been reached (block 67). If so, the HOME TODAY program cycle is vacated and the system returns to the normal program cycle (block 33) and picks up at the then-current last program temperature value. If the last program start time had not yet been reached, the system continues and maintains the HOME TODAY temperature set point (block 67 negative and return to block 51).

If, on the other hand, the Home Type memory was set at Type 1, the HOME TODAY program cycle will test or check whether if, for that day, any program has been passed, i.e., if the start time for any program has passed (block 69). If, for example, when in the Type 1 mode, it is after midnight but before the first program start time is reached for that next day block 69 will be negative and the HOME TODAY program cycle will continue (block 51). If a program has passed (block 69, affirmative), the system then determines if the day has changed since entering the HOME TODAY (block 71). If it has, which suggests that the first program of the subsequent day has been reached, the system reverts back to the normal program cycle (block 33). If the day has not changed (block 71, negative), HOME TODAY continues to maintain STEMP.

The HOME TODAY program cycle will vacate from Type 1 to the normal program cycle whenever any program start time is passed that day after being in the Type 1 mode (block 69 affirmative) and the current day is other than the day that the user entered HOME TODAY (block 71 affirmative). Thus, if the user entered HOME TODAY after the penultimate program of the day was reached, thus setting the Type 1 mode, then if a program start time is passed and there has been any day change since entering HOME TODAY, such as a manual day-change by the user, the HOME TODAY program cycle will be vacated. For example, if HOME TODAY is entered between 3:30 p.m. and 11:00 p.m. in the program set of TABLE 1, and the time passes to 11:30 p.m., block 69 will be affirmative. If at that time, the user manually changes the day, block 71 will be affirmative and HOME TODAY will be vacated. Other examples should be apparent from the flowcharts.

Modifications to the specific embodiment described above may be made without departing from the present invention. For example, the present invention is not limited to the precise flow chart sequences described above; the HOME TODAY system and functions might be obtained with different flow chart sequences. For example, the precise order in which the system monitors the keys or is interrupted when in the HOME TODAY program cycle is certainly not critical. Other flow chart sequence changes are possible without departing from the present invention, the scope of which is limited only by the scope of the claims and equivalents thereof.

We claim:

1. A programmable thermostat for controlling temperature in accordance with program set temperature values, said programmable thermostat including a memory for receiving a program set for at least one of a heating and cooling mode, said program set defined by a plurality of time/temperature programs, over a daily period, each program including a program start time value, and corresponding program temperature values for each of the at least one heating and cooling modes;

a manually selectable input element for initiating a change to the then current program set temperature value;

means responsive to selection of said input element for automatically re-setting the then-current program set temperature value to the highest program temperature value of the day when in a heating mode and the lowest program temperature value of the day when in a cooling mode.

2. The programmable thermostat of claim 1 wherein said re-set temperature value is maintained until reaching the last program start time of the day and then automatically setting the temperature to the temperature value for the last program of the day.

3. The programmable thermostat of claim 1 wherein said re-set temperature value is maintained until reaching the first program start time of the next day and then automatically setting the temperature to the temperature value for the first program of the next day.

4. The programmable thermostat of claim 1 wherein said re-set temperature value is maintained until reaching the last program start time of the day in response to selection of the input element prior to reaching the penultimate program start time of the day.

5. The programmable thermostat of claim 1 wherein said re-set temperature value is maintained until reaching the first program start time of the next day in response to selection of the input element after reaching the penultimate program start time of the day.

6. The programmable thermostat of claim 1 further comprising means for changing the re-set temperature value.

7. The programmable thermostat of claim 1 further comprising means responsive to subsequent selections of said input element to change the maintenance of the re-set temperature value to the first program start time of the next day.

8. The programmable thermostat of claim 1 further comprising a manually-selectable second input element for initiating a reversion back to the program temperature value.

9. A method of pre-programming a thermostat having a display, a plurality of operator selectable input elements, a memory for storing a program set of plural time values over a daily time period and corresponding heating and cooling temperature set point values, and a processor for controlling the thermostat setting of heating and cooling temperatures in accordance with the time and temperature set point values of the program set stored in memory and for temporarily changing the heating and cooling set point temperatures, said thermostat pre-programmed to perform the steps of:

responding to selection of at least one of said input elements to initiate a temperature set point change from the program set in memory;

determining if the thermostat is in a heating or a cooling mode;

setting the temperature set point value to the highest temperature value of the program set in memory when the thermostat is in a heating mode; and setting the temperature set point value to the lowest temperature value of the program set in memory when the thermostat is in a cooling mode.

10. The method of claim 9 further comprising the steps of maintaining the temperature set point value until the last program time of the day is reached, and then reverting to the program set.

11. The method of claim 9 comprising the steps of maintaining the temperature set point value until the first program time of the next day is reached, and then reverting to the program set.

12. The method of claim 9 including the steps of responding to selection of at least one of said input elements to change between heating and cooling modes and re-setting the temperature value to the highest temperature value of the program set if the change is from cooling to heating mode and re-setting the temperature value to the lowest temperature value of the program set if the change is from heating to cooling mode.

13. The method of claim 9 including the step of responding to selection of at least one of said input elements for reverting to the program set.

14. The method of claim 9 including the step of responding to selection of at least one of said input elements for changing the temperature set point value.

15. The method of claim 9 further comprising the step of determining if at least one of said input elements was selected at a time of day prior to reaching the program start time for the penultimate program time and, if affirmative, maintaining the set temperature value until the last program time of the day is reached.

16. The method of claim 15 including the step of responding to subsequent selections of said at least one of said input elements to maintain the set temperature until the first program time of the next day is reached.

17. The method of claim 9 further comprising the step of determining if at least one of said input elements was selected at a time of day after reaching the program start time for the penultimate program time and, if affirmative, maintaining the set temperature value until the first program time of the next day is reached.

18. A programmable thermostat operable in a program mode for controlling temperature in accordance with program set temperature values, said programmable thermostat including a memory for receiving a program set for at least one of a heating and cooling operation, said program set defined by a plurality of time/temperature programs, over a daily period, each program including a program start time value, and a corresponding program temperature value;

a manually selectable input element for initiating a temporary change from the program mode;

means responsive to selection of said input element for automatically re-setting the then-current program set temperature value to a predetermined comfort temperature value selected from one of the program temperature values of the day.

19. A method of pre-programming a thermostat having a display, a plurality of operator selectable input elements, a memory for storing a program set of plural time values over a daily time period and corresponding heating and cooling temperature set point values, and a processor for controlling the thermostat setting of heating and cooling temperatures in accordance with the time and temperature set point values of the program set stored in memory and for temporarily changing the heating and cooling set point temperatures, said thermostat pre-programmed to perform the steps of:

responding to selection of at least one of said input elements to initiate a temperature set point change from the program set in memory;

determining if the thermostat is in a heating or a cooling mode;

setting the temperature set point value to a heating comfort temperature value selected from one of the temperature values of the program set in memory when the thermostat is in a heating mode; and setting the temperature value to a cooling comfort temperature value selected from one of the temperature set point values of the program set in memory when the thermostat is in a cooling mode.

* * * * *